No. 784,874. PATENTED MAR. 14, 1905.
C. MILLER.
MOLD.
APPLICATION FILED FEB. 10, 1904.
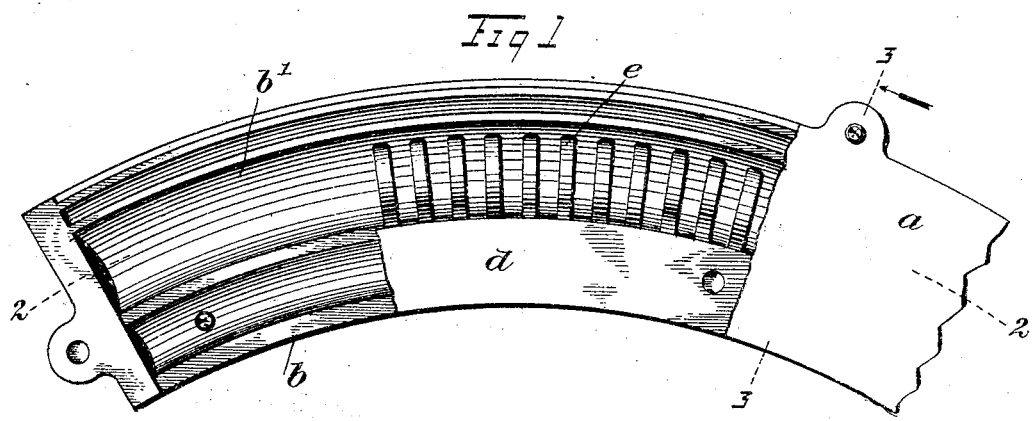
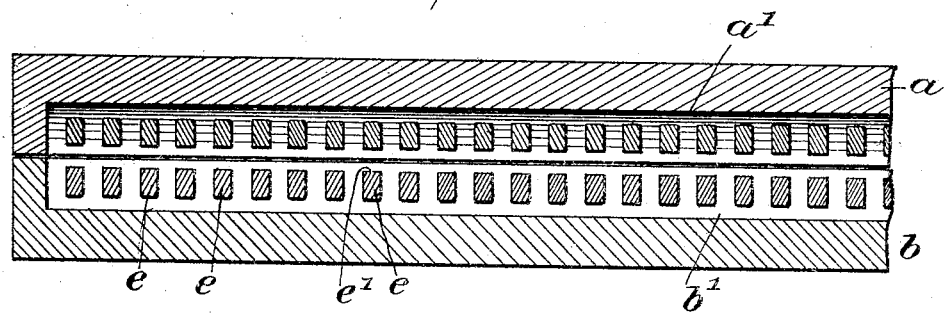
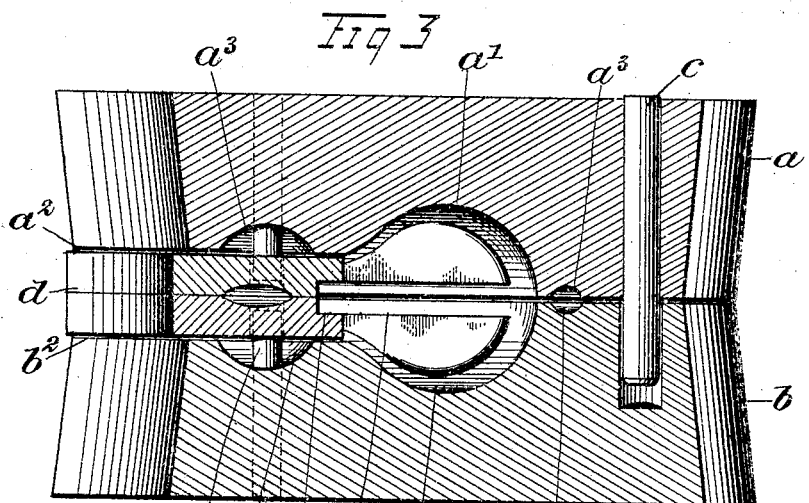
WITNESSES:
John J. Kittle
Isaac B. Owens
INVENTOR
Charles Miller
BY
Munn
ATTORNEYS No. 784,874.   Patented March 14, 1905.

UNITED STATES PATENT OFFICE.

CHARLES MILLER, OF BINGHAMTON, NEW YORK.

MOLD.

SPECIFICATION forming part of Letters Patent No. 784,874, dated March 14, 1905.

Application filed February 10, 1904. Serial No. 192,881.

*To all whom it may concern:*

Be it known that I, CHARLES MILLER, a citizen of the United States, and a resident of Binghamton, in the county of Broome and State of New York, have invented a new and Improved Mold, of which the following is a full, clear, and exact description.

This invention relates to a mold for forming rubber articles, particularly elastic rubber cores for cushion-tires.

The invention resides in a peculiarly-formed mold-core which, combined with the mold proper, enables me to shape a cellular elastic tire-core, as will be fully set forth hereinafter.

This specification is an exact description of one example of my invention, while the claims define the actual scope of the invention.

Reference is to be had to the accompanying drawings, forming a part of this specification, in which similar characters of reference indicate corresponding parts in all the views.

Figure 1 is a plan view of the mold with parts of the mold proper and core broken away. Fig. 2 is a section on the line 2 2 of Fig. 1, and Fig. 3 is a cross-section on the line 3 3 of Fig. 1.

The mold may be made full circular, so as to mold the tire-core in one integral piece, or it may be made in segmental sections, as desired. The drawings illustrate the end portion of a segmental mold-section.

The mold proper comprises two sections $a$ and $b$, formed of any suitable material and adapted to match together, as shown.

$c$ indicates dowel-pins fastened to one section and arranged to engage in the other section to insure proper connection between the two. The sections $a$ and $b$ of the mold proper have mold-cavities $a'$ and $b'$ formed therein and running throughout the length of the mold, these cavities being arranged to match with each other to produce a single cavity of a cross-sectional form corresponding to that of the outer surface of the tire-core. Outward from the mold-cavities $a'$ and $b'$ the mold-sections $a$ and $b$ are adapted directly to engage, and at the inner side of said cavity the opposite walls $a^2$ and $b^2$ are spaced from each other to receive the body $d$ of the core. The said body may be formed in sections or integral, as desired, and of any suitable material. The body $d$ of the core carries spaced fingers $e$, which project into the mold-cavity and are formed with rounding outer edges, as shown. Extending through the fingers $e$ longitudinally of the mold is a groove or passage $e'$, giving the fingers $e$ the cross-sectional form shown in Fig. 2. Said groove or passage $e'$ may or may not be extended into the body $d$ of the core. As indicated at $d'$ in Fig. 3, the said passage $e'$ is extended into the inner edge of the body $d$.

$f$ indicates dowel-pins for positioning the core in the mold, and, if desired, the mold-sections may be formed with cavities $a^3$ and $b^3$ to reduce the weight thereof.

In the use of the invention the soft rubber is forced between the fingers within the longitudinal groove $e'$ and over the fingers $e$, so as completely to incase the same. After this has been done the core is placed in position in the mold and the rubber cured or vulcanized in the usual manner, causing the rubber to soften and assume an integral or homogeneous condition, thus producing an integral resilient rubber core. After the rubber has been properly cured the core is withdrawn from the rubber by pulling the fingers $e$ out laterally from the core, thus leaving the cellular core intact.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. The combination of a mold proper, comprising two sections with longitudinal matching cavities, the sections engaging each other at one side of the cavities and being spaced apart at the other side, and a core comprising a body set between the said spaced surfaces of the mold-sections and spaced fingers carried by the body and projecting from the inner edge of the core-body into the cavities of the mold-sections, said fingers being of a shape corresponding to the shape of the mold-cavity.

2. The combination of a mold proper, comprising two sections with longitudinal matching cavities, the sections engaging each other at one side of the cavities and being spaced apart at the other side, and a core comprising a body set between the said spaced surfaces of the mold-sections and spaced fingers carried by the body and projecting into the cavities of the mold-sections, said fingers having a passage running through them longitudinally of the core.

3. The combination of a mold proper, comprising two sections with longitudinal matching cavities, the sections engaging each other at one side of the cavities and being spaced apart at the other side, and a core comprising a body set between said spaced surfaces of the mold-sections and spaced fingers carried by the body and projecting from the inner edge thereof into the cavities of the mold-sections, said core-body having at its inner edge, a central annular groove, which extends outwardly through the fingers in a plane at right angles to the sides of the fingers.

4. A mold-core, comprising a body having a series of spaced fingers projecting from the inner edge of the core-body, said fingers being formed with convex outer side edges, for the purpose specified, and the fingers having a passage running through them longitudinally of the core, and said passage extending into the core-body at the side adjacent to the fingers.

5. A mold-core, comprising a curved body having a series of flat fingers projecting from the inner edge of the core-body and spaced from each other and formed with a continuous horizontal passage running through them longitudinally of the core-body at right angles to the spaces between the fingers to divide the fingers into sections spaced from each other.

In testimony whereof I have signed my name to this specification in the presence of two subscribing witnesses.

CHARLES MILLER.

Witnesses:
O. P. Bradley,
W. D. Van Dusen.